United States Patent [19]

Poppi

[11] Patent Number: 4,888,143

[45] Date of Patent: Dec. 19, 1989

[54] FAST TEMPO FIRING PROCESS FOR CERAMIC MATERIALS SUCH AS TILES

[75] Inventor: Mauro Poppi, Modena, Italy

[73] Assignee: Poppi s.P.A., Castellarano, Italy

[21] Appl. No.: 922,285

[22] Filed: Oct. 23, 1986

[30] Foreign Application Priority Data

Nov. 29, 1985 [IT] Italy ................... 40129 A/85

[51] Int. Cl.$^4$ ............................................. F27B 9/02
[52] U.S. Cl. ............................ 264/66; 264/64; 414/159
[58] Field of Search ............... 264/64, 66; 414/159

[56] References Cited

U.S. PATENT DOCUMENTS

| | | | |
|---|---|---|---|
| 2,625,730 | 1/1953 | Cremer | 264/64 |
| 3,020,619 | 2/1962 | Koch | 264/66 |
| 3,254,778 | 6/1966 | Marland et al. | 414/159 |
| 3,351,687 | 11/1967 | Thome et al. | 264/66 |
| 3,594,456 | 7/1971 | Berenstein | 264/66 |

FOREIGN PATENT DOCUMENTS

| | | | |
|---|---|---|---|
| 705831 | 3/1965 | Canada | 264/66 |
| 3202092 | 8/1983 | Fed. Rep. of Germany | 264/66 |

OTHER PUBLICATIONS

Tatnall R. F., Fast Firing, In Ceramic Age, Apr. 1964, pp. 28–30.

Primary Examiner—James Derrington
Attorney, Agent, or Firm—Fay, Sharpe, Beall, Fagan, Minnich & McKee

[57] ABSTRACT

A fast tempo firing process for ceramic tiles is disclosed, in which material to be fired is exposed to a limited number of sharp rises and falls in temperature, occurring in quick succession and followed in each instance by a short stabilization period. The kiln adopted for such a process features a string of individual stages (2, 3, 4, 5), each held at a given set temperature, through which the tiles (8) are conveyed on a roller hearth (6) with transfer from one stage into the next being brought about at high speed.

7 Claims, 2 Drawing Sheets

FAST TEMPO FIRING PROCESS FOR CERAMIC MATERIALS SUCH AS TILES

BACKGROUND OF THE INVENTION

The invention relates to a process by way of which ceramic materials, namely tiles and similar products, can be fired at fast production tempo; a kiln for implementation of such a process is also disclosed.

The ceramics art field is known to embrace high speed firing methods, as used for tiles in particular, for which roller hearth kilns are employed. Tiles are conveyed through the kiln in a continuous stream, with the firing cycle occurring during their passage from end to end. Temperatures are exactingly distributed along the longitudinal axis of the kiln between entry and exit points, and can be depicted graphically as a steady curve comprising an initial rise, an intermediate stretch during which maximum temperature is reached, and a final drop. Thus, proceeding through the kiln, the ceramic material is subjected to ever-increasing temperature values in the pre-heat stage, fired during its passage through the maximum temperature stretch, and then exposed to progressively decreasing temperatures before finally exiting.

In order to implement firing cycles of the kind in question, the kiln must necessarily be of a given length, inasmuch as its longitudinal dimension is directly related to and dependent upon the temperature curve to be produced inside the enclosure.

An additional drawback with conventional kilns is that they do not permit of creating mixed treatment conditions -e.g. controlled atmosphere, in the course of the material's being fired.

The object of the invention disclosed is that of overcoming the drawbacks mentioned above.

SUMMARY OF THE INVENTION

In the firing process disclosed, tiles are exposed to a limited number of sharp rises and falls in temperature produced in quick succession, each of which followed by a short period of stabilization.

The tiles are conveyed through a string of treatment stages, passing from one into the next at high speed, in which given respective temperature levels are imposed and maintained.

The primary advantage of the invention is that firing can be accomplished at fast production tempo utilizing a kiln of significantly compact longitudinal dimensions; also, the embodiment of the kiln itself is such that the ceramic material can be exposed to different types of treatment during its passage through the various stages of the firing cycle.

BRIEF DESCRIPTION OF THE DRAWINGS

The invention will now be described in detail, by way of example, with the aid of the accompanying drawings, in which.

DESCRIPTION OF THE PREFERRED EMBODIMENT

Figure 1:
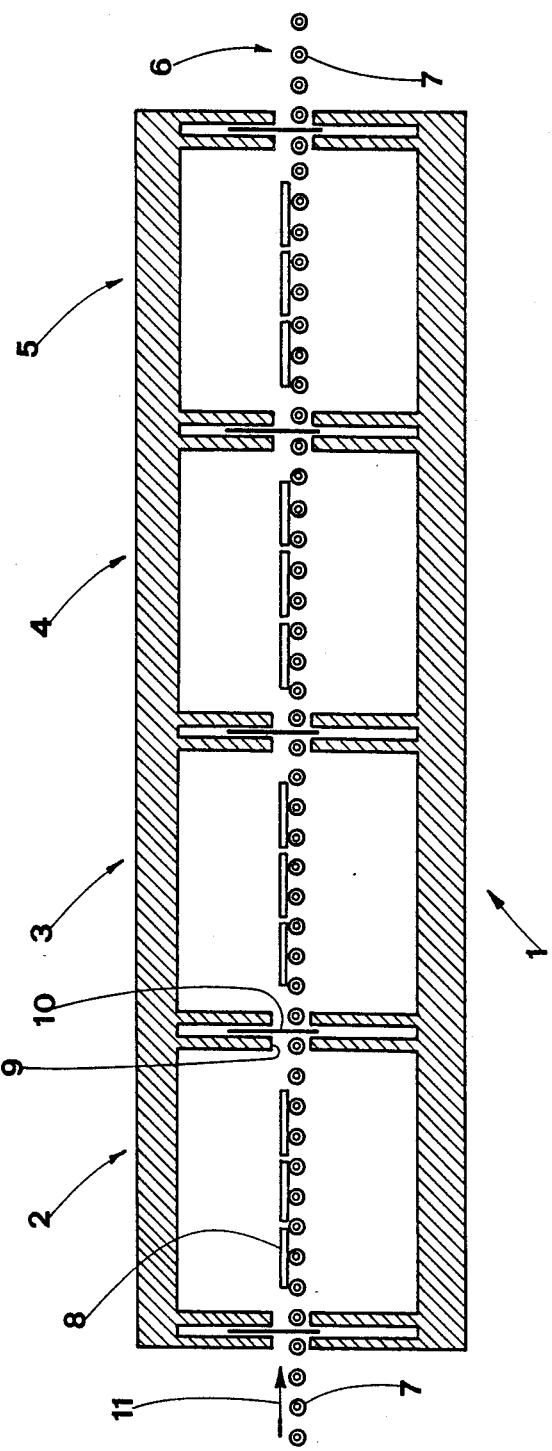
FIG. 1 is the schematic representation of a kiln according to the invention, seen in longitudinal section through a vertical plane.

With reference to the drawings, 1 denotes a kiln in its entirety, the essential feature of which is that it comprises a number of individual treatment zones, or stages, that are separate one from the next and held at given respective temperatures. In the embodiment illustrated, there are four such stages denoted 2, 3, 4 and 5 arranged in regular succession along the length of the kiln. Each stage is independent of the remainder, and provided with means for generating and controlling heat such as will permit of maintaining the interior at a given set temperature. The stages are interconnected by a conveyor system capable of transferring material in process from one stage either to the stage following or to the stage preceding; such a conveyor system consists in a roller hearth 6 of the type widely employed in conventional kilns as commissioned for fast tempo firing of ceramic products in general, and of ceramic tiles in particular. The hearth 6 is composed of a plurality of power driven rollers 7, arranged parallel one with the next in such a way that the tiles 8 can ride over their crests.

Each stage communicates with the adjacent stage by way of an opening 9 large enough to admit the tiles 8 during their passage at high speed from one stage to the next. Whenever ongoing movement ceases, these openings 9 will be blocked, for example by a sliding baffle 10.

Tiles 8 move along the roller hearth 6 in the direction indicated by the arrow 11. The ongoing movement may be continuous, occurring at a constant speed, though more often will be intermittent and at high speed, occuring only when the tiles are transferred from one stage of the kiln into the adjacent stage.

During the time in which tiles remain within a given stage of the kiln, the rollers are made to rotate left and right alternately, in such a way that the tiles are rocked back and forth, but without leaving the area. This is an expedient by way of which tiles can be kept in a given stage of the kiln long enough for temperature to stabilize within the body, regardless of the length of available conveyor space afforded by the stage itself. What is more, the alternating motion set up provides the advantage that the rollers 7 are kept rotating even when the material is effectively at a standstill within the various stages, and the possibility of their becoming permanently distorted is thus avoided.

The option exists of pressurizing certain of the stages 2, 3, 4 or 5 beyond atmospheric, and of forcing circulation of the air within the stage to the end of ensuring a more uniform temperature and gaining a marked enhancement of heat exchange conditions.

Dissimilar temperatures are generated in the various stages so that, on being transferred from one stage to another, the ceramic material in process (tiles 8, in the case in point) will be subjected to a sudden, sharp change in temperature followed immediately by a short period of stabilization. The degree of the rise or fall in temperature and the number of such changes, hence the number of stages making up the kiln, will be determined by the specification of the tiles 8 being manufactured.

The rise or fall in temperature per single stage, denoted $\Delta T$, is determined on the basis of the maximum temperature variation to which the product can be subjected without problems occurring. More exactly, one must avoid rupture attributable to the strain set up in tiles as a result of thermal shock, generated by the rise or fall in temperature they are obliged to undergo.

Similarly, the minimum length of time that the material stays put in any one stage of the kiln following the rise or fall in temperature ΔT will be determined by the product specification; in this instance one seeks to achieve a reduction in internal strain discernable in the tile body, commensurate with the duration of the temperature stabilization period, such as will ensure that the tile's mechanical properties remain unaffected.

Figure 2:
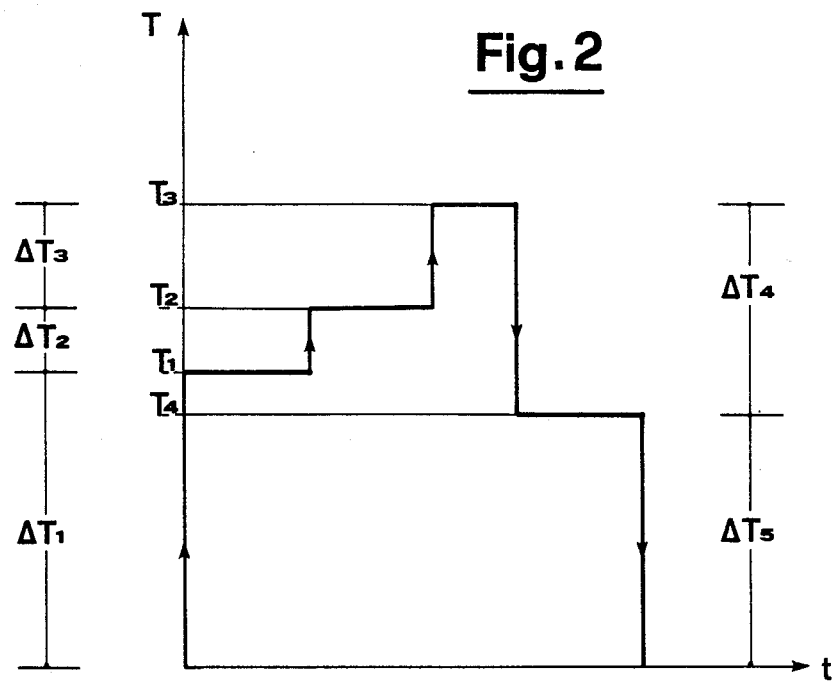
FIGS. 2 and 3 are graphs showing temperature-vs-time coordinates in two different thermal cycles adopted for firing ceramics by way of the process disclosed.
Figure 3:
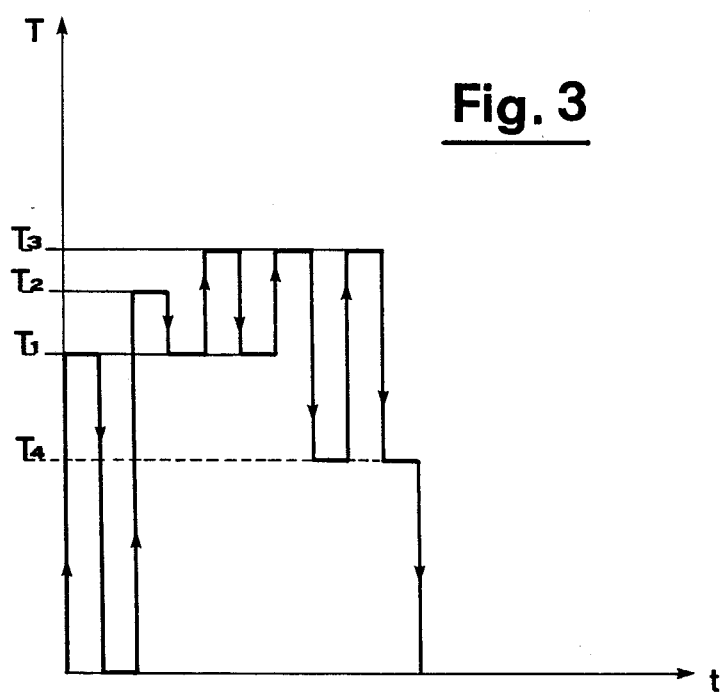

At all events, the thermal cycling to which the product is subjected, that is, the successive changes in temperature T that take place internally of the kiln during a given period of time t, appears graphically as a curve characterized by a series of steps (see FIGS. 2 and 3).

The stepped temperature changes shown in the graphs, which are denoted T1, T2, T3 and T4, illustrate the relative temperature levels maintained in the different stages through which the tiles are taken one by one, rather than the temperature value registering in the ceramic body.

FIG. 2 is the example of a thermal cycle implemented in firing ceramic tiles, which clearly illustrates the successive rises and falls in temperature that occur from stage to stage; it will be remembered that the tiles are transferred from one stage to the next at high speed. In this particular cycle, the product is taken from ambient temperature through three successive rises ΔT1, ΔT2 and ΔT3 each of which is followed by a stabilization period of duration sufficient to ensure that stress imparted to the tile body is kept within limits that permit of maintaining the product's mechanical properties intact. The return from maximum firing temperature to ambient temperature is brought about in just two pronounced falls, denoted ΔT4 and ΔT5.

The same type of product might undergo a thermal cycle as indicated by the temperature-time graph of FIG. 3. This cycle differs from that shown in FIG. 2 inasmuch as each stabilization period occurring during the upward and downward trends of the curve, following the relative rise or fall, is of short duration only, whereupon a sudden reverse of the trend takes place, followed by a similarly brief stabilization period at the opposite extreme before passage to the next temperature level. Such a cycle would be implemented, utilizing the kiln 1 of FIG. 1, by programming the drive such that tiles 8 transferred into a given stage, say stage 3, remain there for a brief period and are then returned to stage 2, whereupon a second passage into stage 3 occurs before ultimate entry into stage 4.

In the cycle of FIG. 3, tiles are subjected to temperature changes of a different order; for example, the initial rise ΔT1 is greater than that of FIG. 2, and would be certain to occasion rupture, or other structural defects, if followed by a stabilization period of duration comparable to that shown in FIG. 2. Thus, each rise or fall ΔT is followed by a stabilization period the maximum duration of which is noticeably less than the corresponding period in a cycle of the type indicated in FIG. 2; following this brief exposure to the new temperature, tiles are returned speedily to the temperature of the previous stage, creating a thermal cycle such as will permit of gaining a certain uniformity in terms of stress imparted to the tile.

The thermal cycles illustrated are given by way of example. In practical application, the product specification might be such as to dictate a quite different number of rises and falls, reduced even to a single rise from ambient to firing temperature in certain instances.

The invention permits of obtaining a firing cycle that can be implemented at particularly fast production tempo by a kiln exhibiting markedly compact longitudinal dimensions. Moreover, the design of the kiln is such that different types of treatment can be exploited on the ceramic material (tiles or otherwise) during the one firing cycle, by virtue of the fact that the product is taken step by step through a succession of distinct stages, the atmosphere of each one of which can be controlled independently of the remainder.

What is claimed is:

1. A process for fast tempo firing of ceramic materials such as tiles and the like, the process comprising:
    transferring the ceramic materials among a plurality of stages within a heating zone of a kiln, such transfers among stages occurring one after the other in quick succession;
    heating each of said plurality of stages to a different temperature than each adjacent stage;
    exposing the ceramic materials to sudden changes in temperature upon their entry into each stage;
    maintaining the ceramic materials in a given stage for a short period of time for allowing them to stabilize in temperature; and
    simultaneously with said step of maintaining, continuously moving the ceramic materials in an alternating back and forth motion, by means of a plurality of rollers which can rotate in alternating directions and which are located within the given stage, for the duration of time during which the materials are maintained in the given stage.

2. The process according to claim 1 wherein the simultaneous steps of maintaining the ceramic materials in a given stage and moving them back and forth within the stage are together followed by the further step of exposing the materials to another change in temperature as the material is transferred to the next stage of the kiln.

3. The process according to claim 1 wherein the step of maintaining the ceramic materials in a stage is of relatively brief duration, and each such step is followed by the step of encountering at least one abrupt transitory change in temperature by the ceramic materials, the step of encountering being followed by a respective brief period of stabilization and constant movement of the ceramic material back and forth prior to implementation of the next sharp change in temperature.

4. The process according to claim 1, wherein the step of continuously moving the material in an alternating back and forth motion is followed by a sequential step of continuously moving the material in an alternating back and forth motion upon the material's entry into a sequential stage.

5. A process for fast tempo firing of ceramic materials such as tiles and the like in a kiln having successively arranged heating and cooling stages, the process comprising the steps of:
    advancing a group of ceramic materials through successive stages of the kiln;
    heating each of said successive stages to a different temperature than each adjacent stage;
    isolating each of said successive stages from each adjacent stage;
    exposing the group of ceramic materials to sharp variations in temperature as they enter each respective stage of the kiln;

stabilizing a temperature of the ceramic materials in each respective stage of the kiln; and, continuously moving the ceramic materials back and forth within said respective stage of the kiln during said step of stabilizing wherein the ceramic materials are advanced through the various stages of the kiln on rollers and wherein the step of continuously moving comprises the subsidiary steps of:

(a) rotating said kiln rollers in a first direction for a first period of time;

(b) rotating said kiln rollers in a second direction for a second period of time; and, (c) repeating steps a and b.

6. The process of claim 5 wherein said step of stabilizing a temperature comprises the subsidiary steps of:

advancing a group of ceramic materials from a first stage of the kiln which is maintained at a first temperature to a second stage of the kiln which is maintained at a second temperature;

exposing the group of ceramic materials to the second temperature for a brief period of time;

returning the group of ceramic materials from the second stage back to the first stage; and, again advancing the group of ceramic materials from the first stage to the second stage.

7. The process of claim 5 further comprising the step of providing a desired gaseous atmosphere in said given stage of the kiln.

* * * * *